United States Patent
Xu et al.

(10) Patent No.: US 9,509,995 B2
(45) Date of Patent: Nov. 29, 2016

(54) SYSTEM AND METHOD FOR ENHANCED DMVD PROCESSING

(75) Inventors: Lidong Xu, Beijing (CN); Yi-Jen Chiu, San Jose, CA (US); Wenhao Zhang, Beijing (CN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 13/996,582

(22) PCT Filed: Dec. 21, 2010

(86) PCT No.: PCT/CN2010/002107
§ 371 (c)(1),
(2), (4) Date: Jun. 21, 2013

(87) PCT Pub. No.: WO2012/083487
PCT Pub. Date: Jun. 28, 2012

(65) Prior Publication Data
US 2014/0146890 A1    May 29, 2014

(51) Int. Cl.
*H04N 7/12* (2006.01)
*H04N 11/02* (2006.01)
(Continued)

(52) U.S. Cl.
CPC ...... *H04N 19/00684* (2013.01); *H04N 19/436* (2014.11); *H04N 19/44* (2014.11); *H04N 19/513* (2014.11)

(58) Field of Classification Search
None
See application file for complete search history.

(56) References Cited

U.S. PATENT DOCUMENTS

| | | | |
|---|---|---|---|
| 6,014,473 | A | 1/2000 | Hossack et al. |
| 6,058,142 | A | 5/2000 | Ishikawa et al. |

(Continued)

FOREIGN PATENT DOCUMENTS

| | | | |
|---|---|---|---|
| CN | 1450809 A | 10/2003 | |
| CN | 1961582 A | 5/2007 | |

(Continued)

OTHER PUBLICATIONS

Werda, I. et al., "Optimal DSP-Based Motion Estimation Tools Implementation for H.264/AVC Baseline Encoder", in: International Journal of Computer Science and Network Security, vol. 7, No. 5, May 2007, pp. 141-150.

(Continued)

*Primary Examiner* — Frederick Bailey
*Assistant Examiner* — Talha M Nawaz
(74) *Attorney, Agent, or Firm* — Green, Howard & Mughal LLP

(57) ABSTRACT

To let decoder side motion vector derivation (DMVD) coded blocks be decoded in parallel, decoder side motion estimation (ME) dependency on spatially neighboring reconstructed pixels can be removed. Mirror ME and projective ME are only performed on two reference pictures, and the spatially neighboring reconstructed pixels will not be considered in the measurement metric of the decoder side ME. Also, at a video decoder, motion estimation for a target block in a current picture can be performed by calculating a motion vector for a spatially neighboring DMVD block, using the calculated motion vector to predict motion vectors of neighboring blocks of the DMVD block, and decoding the DMVD block and the target block in parallel. In addition, determining a best motion vector for a target block in a current picture can be performed by searching only candidate motion vectors in a search window, wherein candidate motion vectors are derived from a small range motion search around motion vectors of neighboring blocks.

24 Claims, 11 Drawing Sheets

(51) Int. Cl.
*H04N 11/04* (2006.01)
*H04N 19/51* (2014.01)
*H04N 19/513* (2014.01)
*H04N 19/44* (2014.01)
*H04N 19/436* (2014.01)

(56) References Cited

U.S. PATENT DOCUMENTS

| | | |
|---|---|---|
| 6,081,554 A | 6/2000 | Lee et al. |
| 6,289,052 B1 | 9/2001 | Faryar et al. |
| 6,519,005 B2 | 2/2003 | Bakhmutsky et al. |
| 6,707,367 B2 | 3/2004 | Castaneda et al. |
| 7,010,279 B2 | 3/2006 | Rofougaran |
| 7,023,921 B2 | 4/2006 | Subramaniyan et al. |
| 7,133,451 B2 | 11/2006 | Kim et al. |
| 7,248,844 B2 | 7/2007 | Rofougaran |
| 7,259,649 B2 | 8/2007 | Ancey et al. |
| 7,260,148 B2 | 8/2007 | Sohm |
| 7,289,672 B2 | 10/2007 | Sun et al. |
| 7,336,720 B2 | 2/2008 | Martemyanov et al. |
| 7,463,687 B2 | 12/2008 | Subramaniyan et al. |
| 7,526,256 B2 | 4/2009 | Bhatti et al. |
| 7,590,180 B2 | 9/2009 | Kang |
| 7,616,692 B2 | 11/2009 | Holcomb et al. |
| 7,683,851 B2 | 3/2010 | Rofougaran et al. |
| 7,751,482 B1 | 7/2010 | Srinivasan et al. |
| 7,764,740 B2 | 7/2010 | Seok et al. |
| 7,880,547 B2 | 2/2011 | Lee et al. |
| 7,890,066 B2 | 2/2011 | Rofougaran |
| 7,924,135 B2 | 4/2011 | Chen et al. |
| 7,940,152 B1 | 5/2011 | Kim et al. |
| 8,107,748 B2 | 1/2012 | Miao et al. |
| 8,233,538 B2 | 7/2012 | Sun et al. |
| 8,238,421 B2 | 8/2012 | Choi et al. |
| 8,279,018 B1 | 10/2012 | Song et al. |
| 8,279,927 B2 | 10/2012 | Sun et al. |
| 8,295,551 B2 | 10/2012 | Lertrattanapanich et al. |
| 8,331,450 B2 | 12/2012 | Sun et al. |
| 8,462,852 B2 | 6/2013 | Xu et al. |
| 8,519,814 B2 | 8/2013 | Feng |
| 8,532,187 B2 * | 9/2013 | Jeon .................... H04N 19/52 375/240.12 |
| 2002/0175320 A1 | 11/2002 | Heun et al. |
| 2002/0176500 A1 | 11/2002 | Bakhmutsky et al. |
| 2003/0031128 A1 | 2/2003 | Kim et al. |
| 2003/0063671 A1 | 4/2003 | Song |
| 2003/0063673 A1 | 4/2003 | Riemens et al. |
| 2003/0095603 A1 | 5/2003 | Lan et al. |
| 2003/0103568 A1 | 6/2003 | Lee et al. |
| 2003/0189981 A1 | 10/2003 | Lee et al. |
| 2004/0046891 A1 | 3/2004 | Mishima et al. |
| 2004/0114688 A1 | 6/2004 | Kang |
| 2004/0223548 A1 | 11/2004 | Kato et al. |
| 2004/0258154 A1 | 12/2004 | Liu et al. |
| 2005/0018772 A1 | 1/2005 | Sung et al. |
| 2005/0135481 A1 | 6/2005 | Sung et al. |
| 2005/0220190 A1 | 10/2005 | Ha et al. |
| 2005/0259736 A1 | 11/2005 | Payson |
| 2005/0286777 A1 | 12/2005 | Kumar et al. |
| 2006/0018383 A1 | 1/2006 | Shi et al. |
| 2006/0109905 A1 | 5/2006 | Seok et al. |
| 2006/0120454 A1 * | 6/2006 | Park .................... H04N 19/52 375/240.16 |
| 2006/0159176 A1 * | 7/2006 | Park .................... H04N 19/63 375/240.16 |
| 2006/0215761 A1 | 9/2006 | Shi et al. |
| 2007/0053440 A1 | 3/2007 | Hsieh et al. |
| 2007/0064803 A1 | 3/2007 | Miao et al. |
| 2007/0064804 A1 | 3/2007 | Paniconi et al. |
| 2007/0086526 A1 | 4/2007 | Koto et al. |
| 2007/0116124 A1 | 5/2007 | Wu et al. |
| 2007/0223585 A1 | 9/2007 | Fujisawa et al. |
| 2007/0239546 A1 | 10/2007 | Blum et al. |
| 2007/0242747 A1 * | 10/2007 | Park .................... H04N 19/51 375/240.12 |
| 2007/0268964 A1 | 11/2007 | Zhao |
| 2007/0280354 A1 * | 12/2007 | Park .................... H04N 19/513 375/240.15 |
| 2007/0297510 A1 | 12/2007 | Herpel et al. |
| 2008/0008241 A1 * | 1/2008 | Park .................... H04N 19/63 375/240.16 |
| 2008/0069230 A1 | 3/2008 | Kondo et al. |
| 2008/0101707 A1 | 5/2008 | Mukherjee et al. |
| 2008/0159398 A1 | 7/2008 | Murakami et al. |
| 2008/0159400 A1 | 7/2008 | Lee et al. |
| 2008/0175320 A1 | 7/2008 | Sun et al. |
| 2008/0181309 A1 | 7/2008 | Lee et al. |
| 2008/0214146 A1 | 9/2008 | Lincoln et al. |
| 2008/0240242 A1 * | 10/2008 | Lainema ................ H04N 19/52 375/240.16 |
| 2008/0253149 A1 | 10/2008 | Matumoto |
| 2008/0253457 A1 | 10/2008 | Moore |
| 2008/0281685 A1 | 11/2008 | Jaffe et al. |
| 2009/0060359 A1 | 3/2009 | Kim et al. |
| 2009/0067505 A1 | 3/2009 | Tourapis et al. |
| 2009/0161763 A1 | 6/2009 | Rossignol et al. |
| 2009/0172751 A1 | 7/2009 | Aldrey et al. |
| 2009/0207915 A1 | 8/2009 | Yan et al. |
| 2009/0238268 A1 | 9/2009 | Hsu et al. |
| 2009/0304084 A1 | 12/2009 | Hallapuro et al. |
| 2010/0046614 A1 | 2/2010 | Choi et al. |
| 2010/0109798 A1 | 5/2010 | Chu |
| 2010/0201457 A1 | 8/2010 | Lee et al. |
| 2011/0002387 A1 | 1/2011 | Chiu et al. |
| 2011/0002389 A1 | 1/2011 | Xu et al. |
| 2011/0002390 A1 | 1/2011 | Chiu et al. |
| 2011/0043316 A1 | 2/2011 | Yang et al. |
| 2011/0090964 A1 | 4/2011 | Xu et al. |
| 2011/0176611 A1 * | 7/2011 | Huang .................... H04N 19/56 375/240.16 |
| 2011/0261882 A1 | 10/2011 | Zheng et al. |
| 2011/0286523 A1 | 11/2011 | Dencher |
| 2012/0063514 A1 * | 3/2012 | Lin ....................... H04N 19/56 375/240.14 |
| 2012/0294370 A1 | 11/2012 | Chiu et al. |
| 2013/0064296 A1 | 3/2013 | Sun et al. |
| 2013/0082810 A1 | 4/2013 | Feng et al. |
| 2013/0287111 A1 | 10/2013 | Xu et al. |
| 2013/0336402 A1 | 12/2013 | Xu et al. |

FOREIGN PATENT DOCUMENTS

| | | |
|---|---|---|
| CN | 1977539 A | 6/2007 |
| CN | 101001377 A | 7/2007 |
| CN | 101005620 | 7/2007 |
| CN | 101018334 | 8/2007 |
| CN | 101023673 A | 8/2007 |
| CN | 101023676 A | 8/2007 |
| CN | 101378504 A | 3/2009 |
| CN | 101621696 A | 1/2010 |
| CN | 101647285 A | 2/2010 |
| CN | 101945276 A | 1/2011 |
| CN | 102045563 A | 5/2011 |
| CN | 102340664 A | 2/2012 |
| DE | 10 2010 025 816 A1 | 1/2011 |
| DE | 10 2010 046 508 A1 | 6/2011 |
| DE | 10 2011 008 630 A1 | 9/2011 |
| EP | 1903798 A2 | 3/2008 |
| EP | 1932366 A2 | 6/2008 |
| EP | 1936995 | 6/2008 |
| EP | 1936998 | 6/2008 |
| EP | 1981281 A2 | 10/2008 |
| EP | 2124455 A1 | 11/2009 |
| GB | 2248361 | 4/1992 |
| GB | 2471577 A | 1/2011 |
| GB | 2477033 B | 4/2012 |
| JP | 10-023420 A | 1/1998 |
| JP | 10-164596 A | 6/1998 |
| JP | 10-336666 A | 12/1998 |
| JP | 11-205799 A | 7/1999 |
| JP | 2000-350211 A | 12/2000 |
| JP | 2003-169338 A | 6/2003 |
| JP | 2003-319400 A | 11/2003 |
| JP | 2004-048512 A | 2/2004 |

(56) References Cited

FOREIGN PATENT DOCUMENTS

| | | |
|---|---|---|
| JP | 2004-328633 A | 11/2004 |
| JP | 2004-343349 A | 12/2004 |
| JP | 2005-094458 A | 4/2005 |
| JP | 2005-269164 A | 9/2005 |
| JP | 2006-033433 A | 2/2006 |
| JP | 2009-044350 A | 2/2009 |
| JP | 2011-029863 A | 2/2011 |
| JP | 4-928627 B2 | 5/2012 |
| KR | 10-2009-0069461 A | 7/2009 |
| KR | 10-2011-0003438 A | 1/2011 |
| TW | 494686 | 7/2007 |
| TW | I298597 | 7/2008 |
| TW | I301953 | 10/2008 |
| TW | I303944 | 12/2008 |
| TW | 2011-27068 A | 8/2011 |
| TW | 2012-04054 A1 | 1/2012 |
| TW | 200708115 | 6/2012 |
| WO | 2006/000504 A1 | 1/2006 |
| WO | 2007/035276 A2 | 3/2007 |
| WO | 2007035276 | 3/2007 |
| WO | 2008/111451 A1 | 9/2008 |
| WO | 2008117158 A1 | 10/2008 |
| WO | 2009/110754 A2 | 9/2009 |
| WO | 2009/110754 A3 | 10/2009 |
| WO | 2010/086041 A1 | 8/2010 |
| WO | 2010086041 A1 | 8/2010 |
| WO | 2012/045225 A1 | 4/2012 |
| WO | 2012045225 | 4/2012 |
| WO | 2012/083487 A1 | 6/2012 |
| WO | 2012/125178 A1 | 9/2012 |
| WO | 2013/048908 A1 | 4/2013 |

OTHER PUBLICATIONS

Office Action for Chinese Patent Application No. 201080068069.8, issued on Feb. 2, 2015, English translation of Office Action included.
European Search Report for EP Patent Application No. 10860988.4, issued on Apr. 16, 2015.
Y-Jen Chiu et al., "TE1: Fast techniques to improve self derivation of motion estimation", 2 Joint Collaborative Team on Video Coding Meeting; Jul. 21-28, 2010, Geneva, Switzerland.
Office Action received for Taiwanese Patent Application No. 100136070, mailed on Jul. 24, 2014, 6 pages of Office Action and 4 pages of English Translation.
Notice of Allowance received for Japanese Patent Application No. 2013-532027, mailed on Jun. 10, 2014, 3 pages of Notice of Allowance only.
Office Action received for Japanese Patent Application No. 2013-540202, mailed on May 20, 2014, 1 page of Office Action and 1 page of English Translation.
Huang et al., "TEI : Decoder-Side Motion Vector Derivation with Switchable Template Matching", Joint Collaborative Team on Video Coding (JCT-VC) of ITU-T SG16 WP3 and ISO/ IEC JTC1/SC29/ WG11, Document: JCTVC-B076, 2nd Meeting: Geneva, CH, Jul. 21-28, 2010, 11 pages.
Office Action and Search Report received for Taiwan Patent Application No. 100123109, mailed on Oct. 22, 2014, 19 pages of Office Action and Search Report including 10 pages of English Translation.
Notice of Allowance received for United Kingdom Patent Application No. 1100658.2, mailed on Mar. 20, 2012, 2 pages.
Extended European Search Report received for European Patent Application No. 11860936.1, mailed on Aug. 29, 2014, 10 pages.
Notice of Allowance received for Chinese Patent Application No. 201110056040.4, mailed on Aug. 6, 2014, 4 pages of Notice of Allowance including 2 pages of English Translation.
Office Action received for Japanese Patent Application No. 2013-540202, mailed on Sep. 16, 2014, 4 pages of Office Action including 2 pages of English Translation.

Office Action received for Japanese Patent Application No. 2013-558003, mailed on Sep. 9, 2014, 6 pages of Office Action including 3 pages of English Translation.
Itani et al., "Adaptive Direct Vector Derivation for Video Coding," 28th Picture Coding Symposium, PCS2010, Dec. 8-10, 2010, pp. 190-193.
International Preliminary Report on Patentability and Written Opinion received for PCT Patent Application No. PCT/US2011/042292, mailed on Sep. 26, 2013, 7 pages.
International Preliminary Report on Patentability and Written Opinion received for PCT Patent Application No. PCT/US2012/056682, mailed on Apr. 10, 2014, 6 pages.
Peng et al., "Block-Based Temporal Error Concealment for Video Packet Using Motion Vector Extrapolation," IEEE, 2002, pp. 10-14.
Satyanarayana et al., "Predictive Search Range and Block Size in Block Matching Motion Estimation Algorithms in Video Coding," IEEE, 2009, 6 pages.
Office Action received for German Patent Application No. 10 2010 046 508.9, mailed on Sep. 5, 2012, 8 pages of Office Action and 5 pages of English Translation.
Office Action received for German Patent Application No. 10 2010 046508.9, mailed on Jul. 26, 2011, 7 pages of Office Action and 7 pages of English Translation.
Notice of Allowance received for Korean Patent Application No. 10-2010-0064539, mailed on Sep. 27, 2012, 2 pages of Notice of Allowance and 1 page of English Translation.
Office Action received for Korean Patent Application No. 10-2010-0064539, mailed on Feb. 10, 2012, 3 pages of English Translation only.
Notice of Allowance received for Korean Patent application No. 10-2010-0102216, mailed on Nov. 26, 2012, 2 pages of Notice of Allowance and 1 page of English Translation.
Office Action received for Korean Patent Application No. 10-2010-0102216, mailed on May 22, 2012, 2 pages of English Translation only.
Office Action received for Korean Patent Application No. 10-2010-0004254, mailed on Jun. 12, 2012, 3 pages of Office Action and 3 pages of English Translation.
Office Action received for Korean Patent Application No. 10-2011-0004254, mailed on Dec. 26, 2012, 3 pages of Office Action and 2 pages of English Translation.
Office Action received for Korea Patent Application No. 10-2011-0004254, mailed on Dec. 17, 2013, 3 pages of Office Action and 4 pages of English Translation.
Office Action received for Korean Patent Application No. 10-2011-0004254, mailed on Jun. 12, 2012, 3 pages of Office Action and 2 pages of English Translation.
Office Action received for Korean Patent Application No. 10-2011-0004254, mailed on Jun. 19, 2013, 5 pages of Office Action and 6 pages of English Translation.
Office Action received for Korean Patent Application No. 10-2013-7002525, mailed on Jan. 24, 2014, 4 pages of Office Action and 3 pages of English Translation.
Office Action received for Taiwanese Patent Application No. 100101277, mailed on Aug. 7, 2013, 9 pages of Office Action and 9 page of English Translation.
Office Action received for Taiwanese Patent Application No. 100101277, mailed on Feb. 14, 2014, 4 pages of Office Action and 7 pages of English Translation.
Combined Search and Examination Report received for United Kingdom Patent Application No. 1011216.7, mailed on Oct. 14, 2010, 6 Pages.
Notice of Allowance received for United Kingdom Patent Application No. 1011216.7, mailed on Aug. 16, 2011, 2 Pages.
Combined Search and Examination Report received for United Kingdom Patent Application No. 1015985.3, mailed on Jan. 17, 2011, 5 Pages.
Combined Search and Examination Report received for United Kingdom Patent Application No. 1100658.2, mailed on May 16, 2011, 6 Pages.
Office Action received for Chinese Patent Application No. 201010270056.0, mailed on Dec. 13, 2012, 5 pages of Office Action and 7 pages of English Translation.

(56) References Cited

OTHER PUBLICATIONS

Office Action received for Chinese Patent Application No. 201010270056.0, mailed on May 3, 2012, 5 pages of Office Action and 5 pages of English Translation.
Office Action received for Chinese Patent Application No. 201010270056.0, mailed on May 27, 2013, 4 pages of Office Action and 5 pages of English Translation.
Office Action received for Chinese Patent Application No. 201010507057.2, mailed on Aug. 3, 2012, 3 pages of Office Action and 3 pages of English Translation.
Office Action received for Chinese Patent Application No. 201010507057.2, mailed on Apr. 12, 2013, 5 pages of Office Action and 7 pages of English Translation.
Office Action received for Chinese Patent Application No. 201010507057.2, mailed on Oct. 28, 2013, 3 pages of Office Action and 4 pages of English Translation.
Notice of Allowance received for Chinese Patent Application No. 201010507057.2, mailed on Mar. 6, 2014, 2 pages of Notice of Allowance and 2 pages of English Translation.
Office Action received for Japanese Patent Application No. 2011-004871, mailed on Nov. 20, 2012, 2 pages of Office action and 2 pages of English Translation.
Office Action received for Japanese Patent Application No. 2011-004871, mailed on Aug. 14, 2012, 2 pages of Office action and 2 pages of English Translation.
Office Action received for Chinese Patent Application No. 201110056040.4, mailed on Mar. 31, 2014, 3 pages of Office Action and 4 pages of English Translation.
Office Action received for Chinese Patent Application No. 201110056040.4, mailed on Sep. 2, 2013, 5 pages of Office Action and 6 pages of English Translation.
Office Action received for Japanese Patent Application No. 2013-532027, mailed on Jan. 21, 2014, 2 pages of Office Action and 2 pages of English Translation.
Office Action received for Japanese Patent Application No. 2013-540202, mailed on Feb. 4, 2014, 1 pages of Office Action and 1 page of English Translation.
International Preliminary Report on Patentability and Written Opinion received for PCT Patent Application No. PCT/CN2010/002107, mailed on Jun. 25, 2013, 6 Pages.
International Search Report and Written Opinion received for PCT Patent Application No. PCT/CN2010/002107, mailed on Oct. 13, 2011, 12 Pages.
International Preliminary Report on Patentability and Written Opinion received for PCT Patent Application No. PCT/CN2011/000568, mailed on Apr. 18, 2013, 4 Pages.
International Search Report and Written Opinion received for PCT Patent Application No. PCT/CN2011/000568, mailed Jan. 19, 2012, 9 pages.
International Search Report and Written Opinion received for PCT Patent Application No. PCT/US2011/042292, mailed on Mar. 23, 2012, 10 Pages.
International Search Report and Written Opinion received for PCT Patent Application No. PCT/US2012/056682, mailed on Mar. 4, 2013, 9 Pages.
Chen, Z. et al., "A Macroblock Level Adaptive Search Range Algorithm for Variable Block Size Motion Estimation in H.264/AVC", in: Proceedings of 2007 International Symposium on Intelligent Signal Processing and Communication Systems, Xiamen, China, Sep. 5, 2012, pp. 598-601.
Chiu, Yi-Jen et al., "Report of self derivation of motion estimation improvement in TMuC", Joint Collaborative Team on Video Coding (JCT-VC) of ITU-T SG16 WP3 and ISO/IEC JTC1/SC29/WG11, URL http://phenix.int-evry.fr/jct/doc_end_user/documents/3_Guangzhou/wg11/JCT VC-C127-m18151-v1-JCTVC-C127.zip, (see JCTVC-C127.doc), Oct. 3, 2010, 13 Pages.
Chiu, Yi-Jen et al., "Self-derivation of motion estimation techniques to improve video coding efficiency", Applications of Digital Image Processing XXXIII Proc. of SPIE, vol. 7798, Sep. 7, 2010, 11 Pages.
Chiu, Yi-Jen et al., "Fast techniques to improve self derivation of motion estimation", Joint Collaborative Team on Video Coding (JCT-VC) of ITU-T SG16 WP3 and ISO/IEC JTC1/SC29/WG11, JCTVC-B047, Jul. 21-28, 2010, 10 Pages.
Guo, Mei et al., "Distributed Video Coding with Spatial Correlation Exploited Only at the Decoder" IEEE, School of Computer Science and Technology, Harbin Institute of Technology, Harbin, 150001, China, Microsoft Research Asia, Beijing, 100080, China. 2007, pp. 41-44.
Hsia, C,. et al., "High Efficiency and Low Complexity Motion Estimation Algorithm for MPEG-4 AVC/H.264 Coding", Tamkang Journal of Science and Engineering, vol. 10, No. 3, 2007, pp. 221-234.
Kamp, S. et al., "Decoder Side Motion Vector Derivation for Inter Frame Video Coding", 15th IEEE International Conference on Image Processing, (ICIP 2008), Oct. 12-15, 2008, pp. 1120-1123.
Kamp, S. et al., "Fast Decoder Side Motion Vector Derivation for Inter Frame Video Coding", Proc. of International Picture Coding Symposium {PCS} '09, Digital Object Identifier 10.1109/PCS.2009.5167453, Print ISBN 978-1-4244-4593-6, IEEE, Piscataway, Chicago, IL, USA, May 6-8, 2009, 4 Pages.
Klomp, S. et al., "Decoder-Side Block Motion Estimation for H.264/MPEG-4 AVC Based Video Coding", IEEE International Symposium on Circuits and Systems, (ISCAS 2009), May 24-27, 2009, pp. 1641-1644.
Laroche, G., et al., "RD Optimized Coding for Motion Vector Predictor Selection", IEEE Transactions on circuits and systems for video technology, vol. 18, No. 12, Dec. 2008, pp. 1681-1691.
Murakami, T. et al., "Advanced B Skip Mode with Decoder-side Motion Estimation", 37th VCEG meeting @ Yokohama, VCEG-AK12, Hitachi Inspire the Next, Central Research Laboratory, Embedded System Platform Research Laboratory, Apr. 15-18, 2009, 8 Pages.
Nisar, H. et al., "Fast Motion Estimation Algorithm based on Spatio-Temporal Correlation and Direction of Motion Vectors", vol. 42, No. 24, Nov. 23, 2006, 2 Pages.
Ueda, M., "TE1.a: Implementation report of Refinement Motion Compensation using DMVD on TMuC", Joint Collaborative Team on Video Coding (JCT-VC) of ITU-T SG16 WP3 and ISO/IEC JTC1/SC29/WG11 JCTVC-C138 URL, http://phenix.int-evry.fr/jct/doc_end_user/documents/3_Guangzhou/wg11/JCT VC-C138-m18162-v1-JCTVC-C138.zip (see JCTVC-C138.doc), Oct. 1, 2010, 18 pages.
Chang, et al: 11 Fast integer motion estimation for H.264 video coding standard 11, 2004 IEEE International Conference on Multimedia and Expo: Jun. 27-30, 2004, Taipei, Taiwan, IEEE Operations Center, Piscataway, NJ, vol. 1, 27 Jun. 2004, 4 pages.
Sullivan et al: "Meeting report of the second meeting of the Joint Collaborative Team on Video Coding (JCT-VC), Geneva, CH, Jul. 21-28, 2010", Oct. 7, 2010, 72 pages.
Office Action for European Patent Application No. 10860988.4 mailed Mar. 16, 2016, 9 pages.
Ugur, et al: 11 Description of video coding technology proposal by Tandberg, Nokia, Ericsson, 1. JCT-VC Meeting; Apr. 15, 2010-Apr. 23, 2010, 2010; Dresden, Apr. 12, 2010, 33 pages.
"Content description data", Telecommunication Standardization Sector of ITU, Erratum 1, Recommendation ITU-T H.262 Amendment 1, Geneva, Apr. 22, 2002. 1 page.
"Series H: Audiovisual and Multimedia Systems Infrastructure of audiovisual services—Coding of moving video", International Telecommunication Union, Series H: Audiovisual and Multimedia Systems, H.262, Feb. 2000, 220 pages.
Second Office Action for Chinese Patent Application No. 201080068069.8 mailed Oct. 20, 2015, 5 pages. (No English Translation Available).
Third Office Action for Chinese Patent Application No. 201080068069.8 mailed Apr. 1, 2016, 3 pages. (No English Translation Available).
"Series H: Audiovisual and Multimedia Systems Infrastructure of audiovisual services—Coding of moving video", International Telecommunication Union, H.262, Amendment 2, Jan. 2007, Informa-

(56) References Cited

OTHER PUBLICATIONS tion technology—Generic coding of moving pictures and associated audio information: Video Amendment 2: Support for colour spaces, 14 pages.
"Series H: Audiovisual and Multimedia Systems Infrastructure of audiovisual services—Coding of moving video", International Telecommunication Union, H.262, Corrigendum 2, Information technology—Generic coding of moving pictures and associated audio information: Video Technical Corrigendum 2, May 2006, 14 pages.
"Series H: Audiovisual and Multimedia Systems Infrastructure of audiovisual services—Coding of moving video", International Telecommunication Union, H.262, Amendment 1, Nov. 2000, 26 pages.
"Series H: Audiovisual and Multimedia Systems Infrastructure of audiovisual services—Coding of moving video", International Telecommunication Union, H.262, Corrigendum 1, Nov. 2000, 10 pages.
"Series H: Audiovisual and Multimedia Systems Infrastructure of audiovisual services—Coding of moving video", International Telecommunication Union, H.264, Nov. 2007, Advanced video coding for generic audiovisual services, 564 pages.
Combined Search and Examination Report for United Kingdom Patent Application No. 1100658.2 mailed May 16, 2011, 6 pages.
Decision of Rejection for Taiwan Patent Application No. 100101277 mailed Jan. 22, 2014, 6 pages.
Final Notification of Reasons for Refusal for Japanese Patent Application No. 2011-004871 mailed Nov. 20, 2012, 4 pages.
First Office Action and Search Report for Chinese Patent Application No. 201110056040.4 mailed Sep. 2, 2013, 11 pages.
Notice of Last Preliminary Rejection for Korean Patent Application No. 10-2010-4254 mailed Jun. 19, 2013, 11 pages.
Notice of Preliminary Rejection for Rejection for Korean Patent Application No. 10-2010-4254 mailed Dec. 26, 2012, 5 pages.
Notice of Preliminary Rejection for Korean Patent Application No. 10-2010-4254 mailed Jun. 12, 2012, 6 pages.
Office Action and Search Report for Taiwan Patent Application No. 100101277 mailed Aug. 7, 2013, 19 pages.
Office Action for German Patent Application No. 10 2011 008 630.7 mailed Oct. 30, 2015, 18 pages.
Reasons for Rejection for Japanese Patent Application No. 2011-004871 mailed Aug. 14, 2012, 4 pages.
Second Office Action for Chinese Patent Application No. 201110056040.4 mailed Mar. 31, 2014, 7 pages.
Final Office Action for U.S. Appl. No. 12/567,540 mailed Jun. 15, 2016, 14 pages.
EP Office Action for European Patent Application No. 11830181.1, mailed Aug. 11, 2016.
Search Report for TW Patent Application No. 104130109, mailed Jul. 28, 2016.

* cited by examiner

SYSTEM AND METHOD FOR ENHANCED DMVD PROCESSING

RELATED APPLICATIONS

This patent application is a U.S. National Phase application under 35 U.S.C. §371 of International Application No. PCT/CN2010/002107, filed Dec. 21, 2010, entitled SYSTEM AND METHOD FOR ENHANCED DMVD PROCESSING.

This application is also related to the following patent applications:

U.S. patent application Ser. No. 12/657,168, filed Jan. 14, 2010.

U.S. patent application Ser. No. 12/567,540, filed Sep. 25, 2009.

U.S. patent application Ser. No. 12/566,823, filed Sep. 25, 2009.

U.S. patent application Ser. No. 12/582,061, filed Oct. 20, 2009.

BACKGROUND

In a traditional video coding system, motion estimation (ME) may be performed at an encoder to get motion vectors for the prediction of motion for a current encoding block. The motion vectors may then be encoded into a binary stream and transmitted to the decoder. This allows the decoder to perform motion compensation for the current decoding block. In some advanced video coding standards, e.g., H.264/AVC, a macroblock (MB) can be partitioned into smaller blocks for encoding, and a motion vector can be assigned to each sub-partitioned block. As a result, if the MB is partitioned into 4×4 blocks, there may be up to 16 motion vectors for a predictive coding MB and up to 32 motion vectors for a bi-predictive coding MB, which may represent significant overhead. Considering that the motion coding blocks have strong temporal and spatial correlations, motion estimation may be performed based on reconstructed reference pictures or reconstructed spatially neighboring blocks at the decoder side. This may let the decoder derive the motion vectors itself for the current block, instead of receiving motion vectors from the encoder. This decoder-side motion vector derivation (DMVD) method may increase the computational complexity of the decoder, but it can improve the efficiency of an existing video codec system by saving bandwidth.

On the decoder side, if a block is encoded using a DMVD method, its motion vector can only be available after performing the decoder side motion estimation. This may affect a parallel decoding implementation in the following two respects. First, if the decoder side motion estimation uses spatially neighboring reconstructed pixels, the decoding of a DMVD block can only be started after its all neighboring blocks (which contain the pixels used in the motion estimation) have been decoded. Second, if one block is encoded in DMVD mode, its motion vectors may be used for the motion vector prediction of its neighboring blocks. So the decoding process of its neighboring blocks, which use the motion vectors of this current DMVD coded block for motion vector prediction, can only be started after the motion estimation of current DMVD block has finished. Therefore, there are dependencies in the above processing, where these dependencies may slow decoding. In particular, the processing at the decoder side may be less amenable to parallel DMVD algorithms.

In addition, motion estimation at the decoder side may, in some implementations, require a search among possible motion vector candidates in a search window. The search may be an exhaustive search or may rely on any of several known fast search algorithms. Even if a relatively fast search algorithm is used, a considerable number of candidates may have to be evaluated before the best candidate may be found. This too represents an inefficiency in processing at the decoder side.

BRIEF DESCRIPTION OF THE DRAWINGS/FIGURES

DETAILED DESCRIPTION

An embodiment is now described with reference to the enclosed figures. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to enhance processing at the decoder in a video compression/decompression system.

Figure 1:
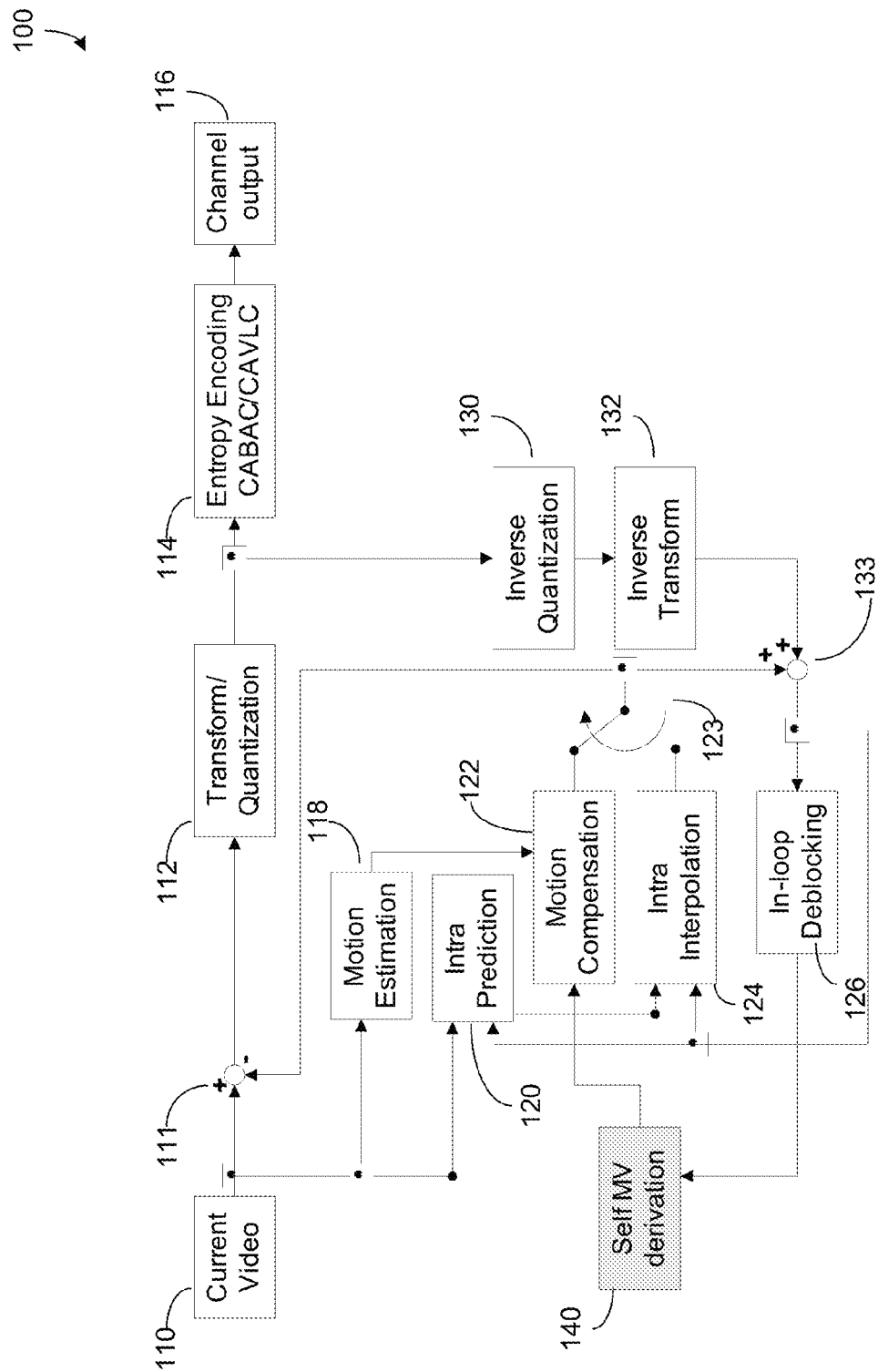
FIG. 1 is a block diagram of a video encoder system, according to an embodiment.

The enhanced processing described herein may take place in the context of a video encoder/decoder system that implements video compression and decompression, respectively. FIG. 1 illustrates an exemplary H.264 video encoder architecture 100 that may include a self MV derivation module 140, where H.264 is a video codec standard. Current video information may be provided from a current video block 110 in the form of a plurality of frames. The current video may be passed to a differencing unit 111. The differencing unit 111 may be part of the Differential Pulse Code Modulation (DPCM) (also called the core video encoding) loop, which may include a motion compensation stage 122 and a motion estimation stage 118. The loop may also include an intra prediction stage 120, and intra interpolation stage 124. In some cases, an in-loop deblocking filter 126 may also be used in the loop.

The current video may be provided to the differencing unit 111 and to the motion estimation stage 118. The motion compensation stage 122 or the intra interpolation stage 124 may produce an output through a switch 123 that may then be subtracted from the current video 110 to produce a residual. The residual may then be transformed and quantized at transform/quantization stage 112 and subjected to entropy encoding in block 114. A channel output results at block 116.

The output of motion compensation stage 122 or intra-interpolation stage 124 may be provided to a summer 133 that may also receive an input from inverse quantization unit 130 and inverse transform unit 132. These latter two units may undo the transformation and quantization of the transform/quantization stage 112. The inverse transform unit 132 may provide dequantized and detransformed information back to the loop.

A self MV derivation module 140 may implement the processing described herein for derivation of a motion vector from previously decoded pixels. Self MV derivation module 140 may receive the output of in-loop deblocking filter 126, and may provide an output to motion compensation stage 122.

Figure 2:
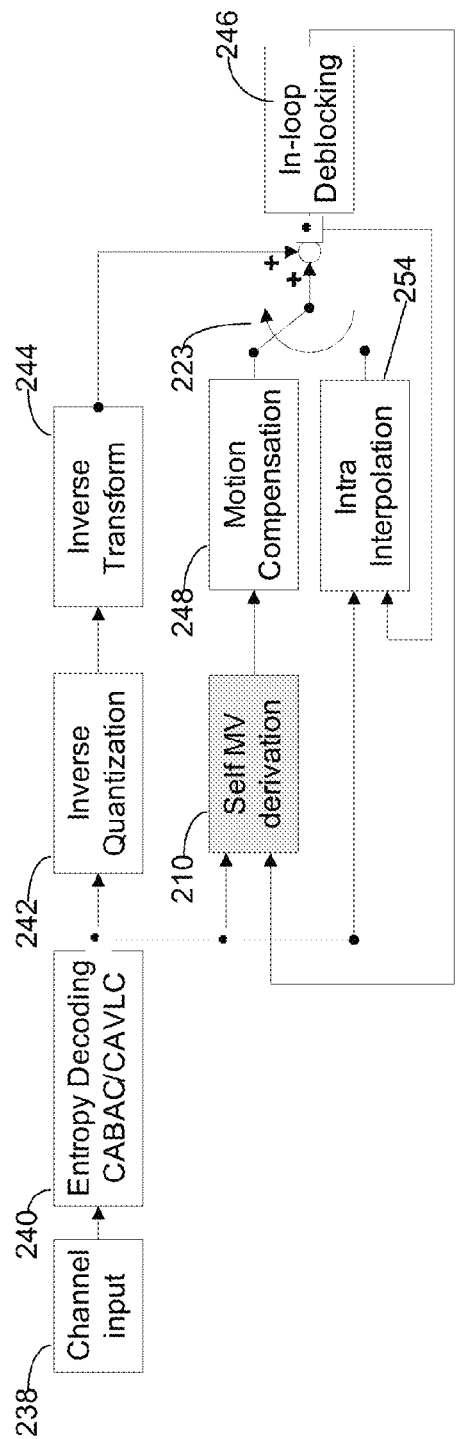
FIG. 2 is a block diagram of a video decoder system, according to an embodiment.

FIG. 2 illustrates an H.264 video decoder 200 with a self MV derivation module 210. Here, a decoder 200 for the encoder 100 of FIG. 1 may include a channel input 238 coupled to an entropy decoding unit 240. The output from the decoding unit 240 may be provided to an inverse quantization unit 242 and an inverse transform unit 244, and to self MV derivation module 210. The self MV derivation module 210 may be coupled to a motion compensation unit 248. The output of the entropy decoding unit 240 may also be provided to intra interpolation unit 254, which may feed a selector switch 223. The information from the inverse transform unit 244, and either the motion compensation unit 248 or the intra interpolation unit 254 as selected by the switch 223, may then be summed and provided to an in-loop deblocking unit 246 and fed back to intra interpolation unit 254. The output of the in-loop deblocking unit 246 may then be fed to the self MV derivation module 210.

The self MV derivation module at the encoder may synchronize with the video decoder side. The self MV derivation module could alternatively be applied on a generic video codec architecture, and is not limited to the H.264 coding architecture.

The encoder and decoder described above, and the processing performed by them as described above, may be implemented in hardware, firmware, or software, or some combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Dependency on Spatially Neighboring Reconstructed Pixels

Decoder side motion estimation (ME) is based on the assumption that the motions of a current coding block may have strong correlations with those of its spatially neighboring blocks and those of its temporally neighboring blocks in reference pictures. FIG. 3-FIG. 6 show different decoder side ME methods which may employ different kinds of correlations.

Figure 3:
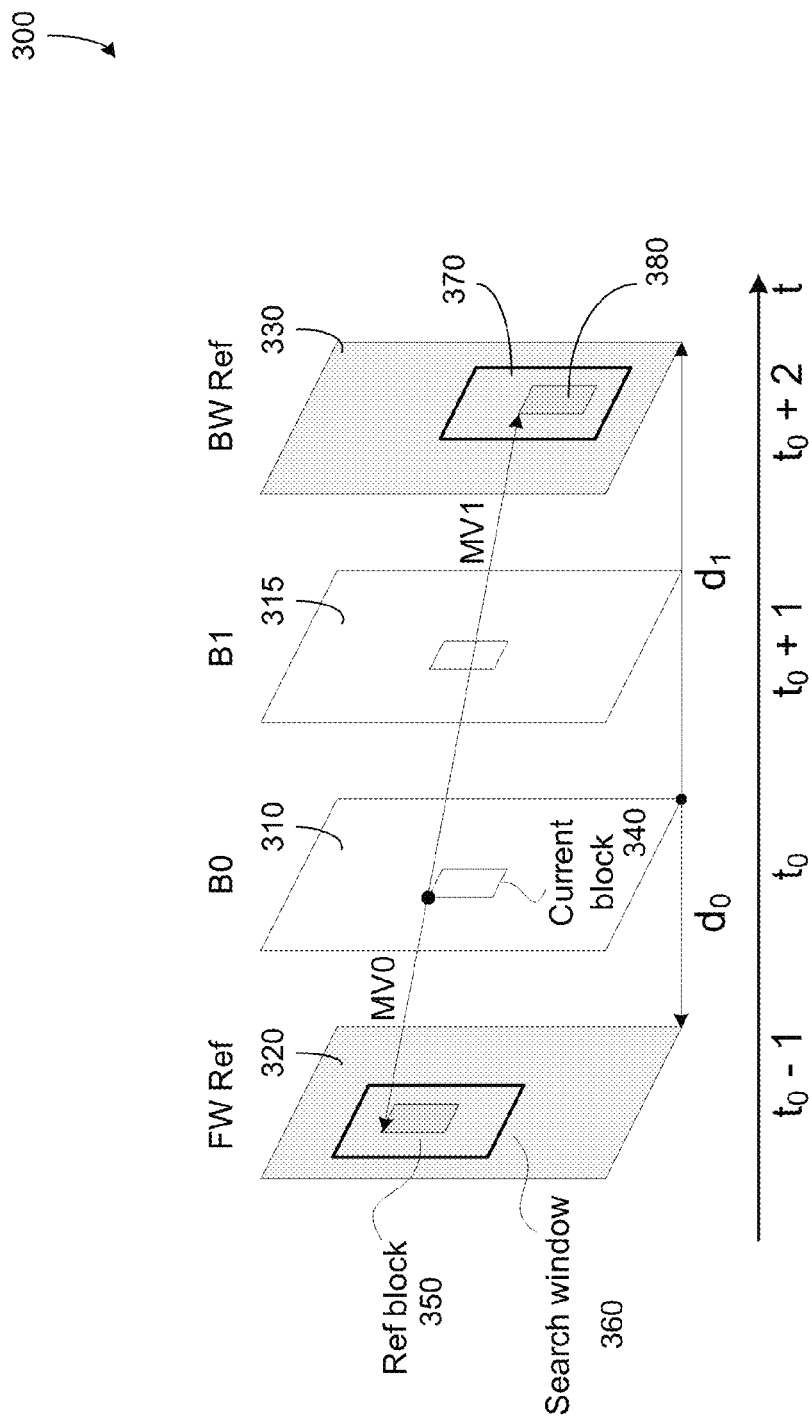
FIG. 3 is a diagram illustrating mirror motion estimation (ME) at a decoder, according to an embodiment.
Figure 4:
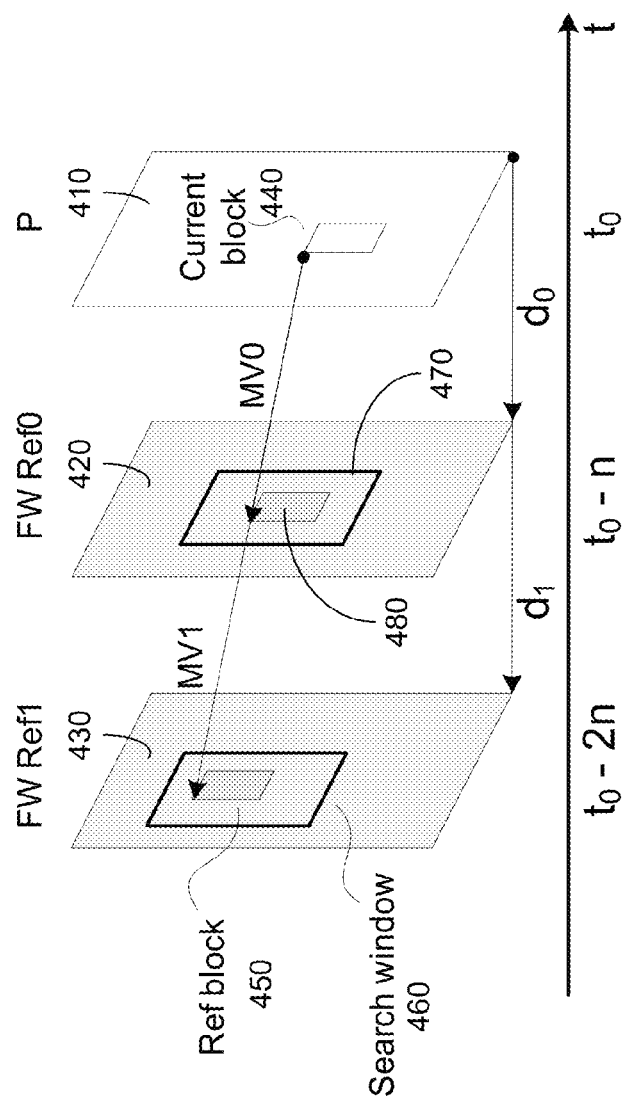
FIG. 4 is a diagram illustrating projective ME at a decoder, according to an embodiment.

The mirror ME in FIG. 3 and projective ME in FIG. 4 may be performed between two reference frames by taking advantage of the temporal motion correlation. In the embodiment of FIG. 3, there may be two bi-predictive frames (B frames), 310 and 315, between a forward reference frame 320 and a backward reference frame 330. Frame 310 may be the current encoding frame. When encoding the current block 340, mirror ME can be performed to get motion vectors by performing searches in search windows 360 and 370 of reference frames 320 and 330, respectively. As mentioned above, where the current input block may not be available at the decoder, mirror ME may be performed with the two reference frames.

FIG. 4 shows an exemplary projective ME process 400 that may use two forward reference frames, forward (FW) Ref0 (shown as reference frame 420) and FW Ref1 (shown as reference frame 430). These reference frames may be used to derive a motion vector for a current target block 440 in a current frame P (shown as frame 410). A search window 470 may be specified in reference frame 420, and a search path may be specified in search window 470. For each motion vector MV0 in the search path, its projective motion vector MV1 may be determined in search window 460 of reference frame 430. For each pair of motion vectors, MV0 and its associated motion vector MV1, a metric, such as a sum of absolute differences, may be calculated between (1) the reference block 480 pointed to by the MV0 in reference frame 420, and (2) the reference block 450 pointed to by the MV1 in reference frame 430. The motion vector MV0 that yields the optimal value for a metric, e.g., the minimal SAD, may then be chosen as the motion vector for target block 440.

Figure 5:
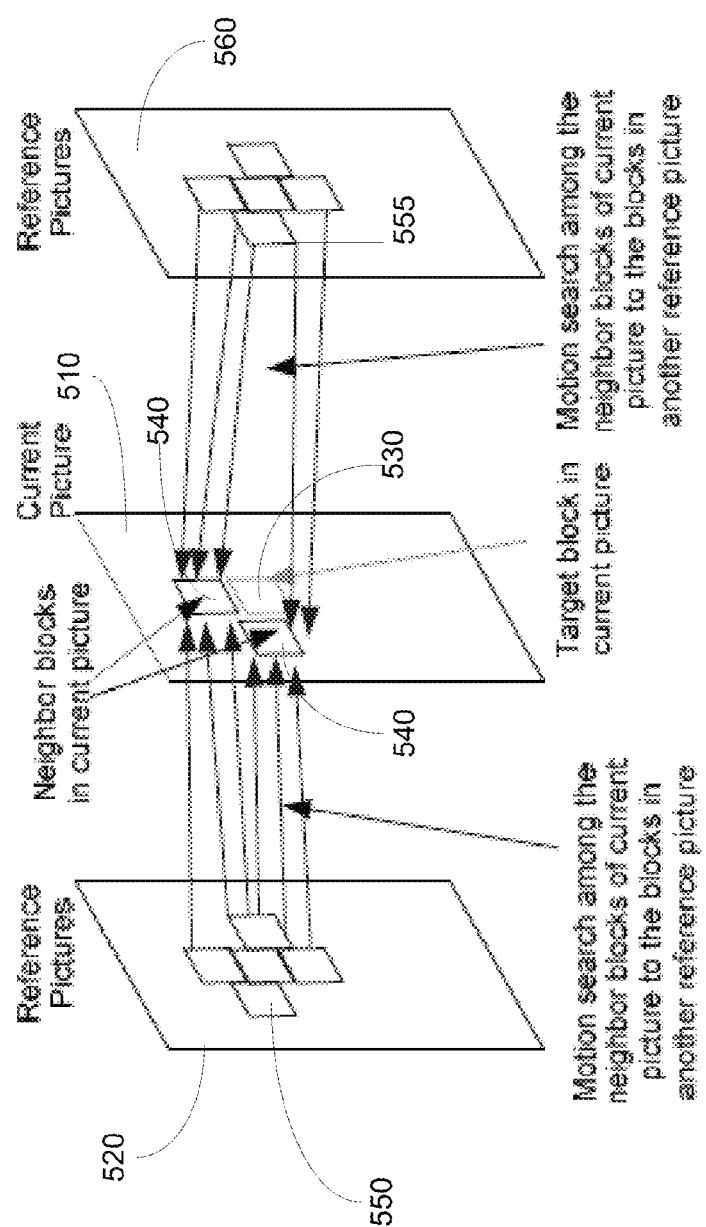
FIG. 5 is a diagram illustrating spatial neighbor block ME at a decoder, according to an embodiment.

To improve the accuracy of the output motion vectors for a current block, some implementations may include the spatial neighboring reconstructed pixels in the measurement metric of decoder side ME. In FIG. 5, decoder side ME may be performed on the spatially neighboring blocks by taking advantage of spatial motion correlation. FIG. 5 shows an embodiment 500 that may utilize one or more neighboring blocks 540 (shown here as blocks above and to the left of the target block 530) in a current picture (or frame) 510. This may allow generation of a motion vector based on one or more corresponding blocks 550 and 555 in a previous reference frame 520 and a subsequent reference frame 560, respectively, where the terms "previous" and "subsequent" refer to temporal order. The motion vector can then be applied to target block 530. In an embodiment, a raster scan coding order may be used to determine spatial neighbor blocks above, to the left, above and to the left, and above and to the right of the target block. This approach may be used for B frames, which use both preceding and following frames for decoding.

The approach exemplified by FIG. 5 may be applied to available pixels of spatially neighboring blocks in a current frame, as long as the neighboring blocks were decoded prior to the target block in sequential scan coding order. Moreover, this approach may apply motion search with respect to reference frames in reference frame lists for a current frame.

The processing of the embodiment of FIG. 5 may take place as follows. First, one or more blocks of pixels may be identified in the current frame, where the identified blocks neighbor the target block of the current frame. Motion search for the identified blocks may then be performed, based on corresponding blocks in a temporally subsequent reference frame and on corresponding blocks in a previous reference frame. The motion search may result in motion vectors for the identified blocks. Alternatively, the motion vectors of the neighboring blocks may be determined prior to identification of those blocks. The motion vectors may then be used to derive the motion vector for the target block, which may then be used for motion compensation for the target block. This derivation may be performed using any suitable process known to persons of ordinary skill in the art. Such a process may be, for example and without limitation, weighted averaging or median filtering.

If the current picture has both backward and forward reference pictures in the reference buffer, the same method as used for mirror ME may be used to get the picture level and block level adaptive search range vectors. Otherwise, if only forward reference pictures are available, the method described above for projective ME may be used to get the picture level and block level adaptive search range.

Figure 6:
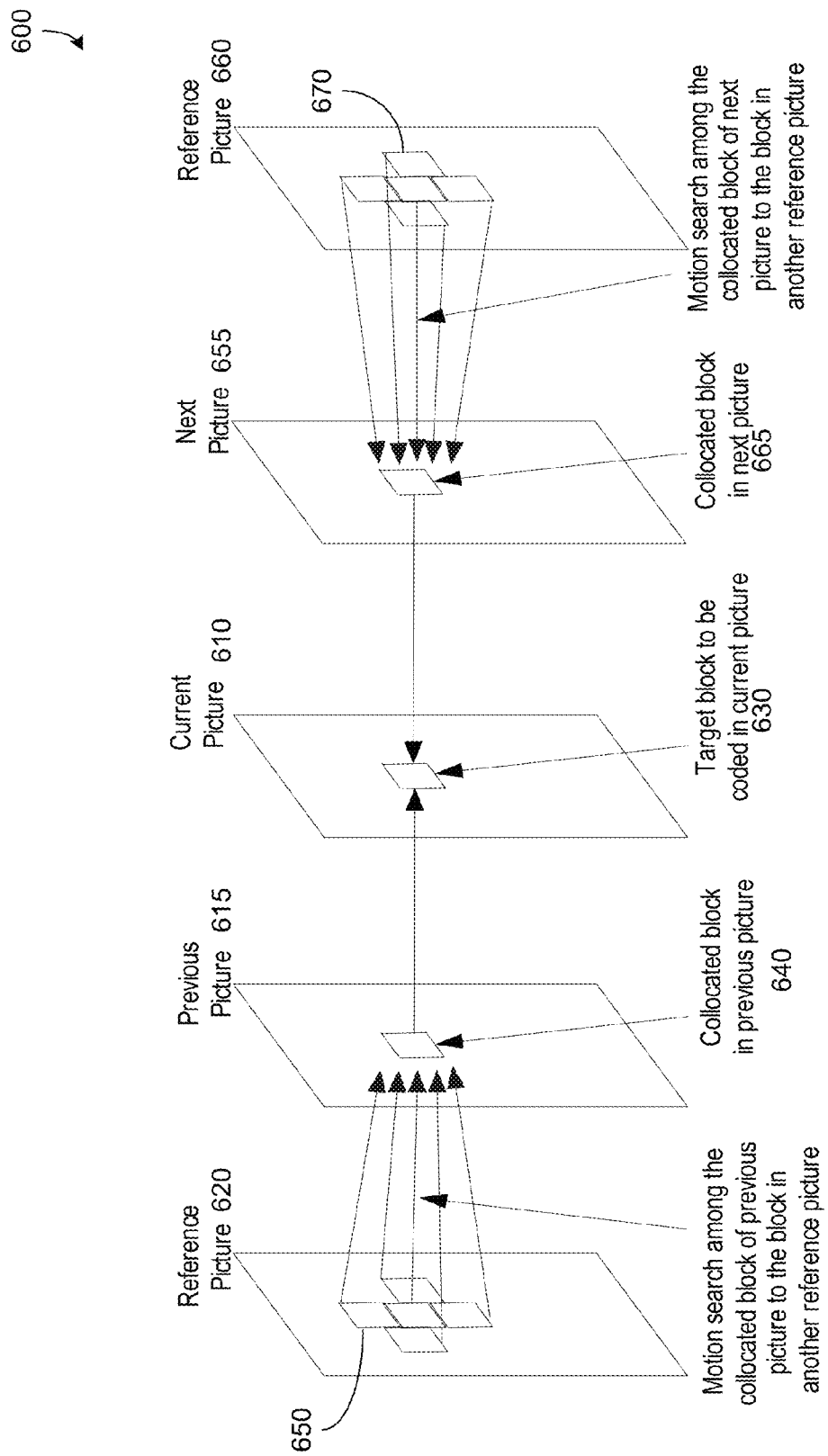
FIG. 6 is a diagram illustrating temporal collocated block ME at a decoder, according to an embodiment.

The corresponding blocks of previous and succeeding reconstructed frames, in temporal order, may be used to derive a motion vector. This approach is illustrated in FIG. 6. To encode a target block 630 in a current frame 610, already decoded pixels may be used, where these pixels may be found in a corresponding block 640 of a previous picture, shown here as frame 615, and in a corresponding block 665 of a next frame, shown as picture 655. A first motion vector may be derived for corresponding block 640, by doing a motion search through one or more blocks 650 of the reference frame, picture 620. Block(s) 650 may neighbor a block in reference frame 620 that corresponds to block 640 of previous picture 615. A second motion vector may be derived for corresponding block 665 of next frame 655, by doing a motion search through one or more blocks 670 of reference picture, i.e., frame 660. Block(s) 670 may neighbor a block in another reference picture 660 that corresponds to block 665 of next frame 655. Based on the first and second motion vectors, forward and/or backward motion vectors for target block 630 may be determined. These latter motion vectors may then be used for motion compensation for the target block.

The ME processing for such a situation may be as follows. A block may first be identified in a previous frame, where this identified block may correspond to the target block of the current frame. A first motion vector may be determined for this identified block of the previous frame, where the first motion vector may be defined relative to a corresponding block of a first reference frame. A block may be identified in a succeeding frame, where this block may correspond to the target block of the current frame. A second motion vector may be determined for this identified block of the succeeding frame, where the second motion vector may be defined relative to the corresponding block of a second reference frame. One or two motion vectors may be determined for the target block using the respective first and second motion vectors above. Analogous processing may take place at the decoder.

When encoding/decoding the current picture, the block motion vectors between the previous frame 615 and the reference frame 620 are available. Using these motion vectors, the picture level adaptive search range can be determined in the manner described above for projective ME. The motion vectors of the corresponding block and blocks that spatially neighbor the corresponding block can be used to derive the block level adaptive search range as in the case of mirror ME.

Since the spatially neighboring reconstructed pixels may be used in the decoder side ME, the decoding of a block encoded in DMVD mode can only be started after all the needed spatially neighboring pixels having been decoded. This decoding dependency can affect efficiency of a parallel implementation of block decoding.

To let the DMVD coded blocks be decoded in parallel, the decoder side ME's dependency on spatially neighboring reconstructed pixels can be removed. Then the mirror ME and projective ME in FIGS. 3 and 4, respectively, may be performed on the two reference pictures only, and the spatially neighboring reconstructed pixels may not be considered in the measurement metric of the decoder side ME. The spatially neighboring block ME in FIG. 5 will be functionally replaced by the temporal collocated block ME shown in FIG. 6, i.e., the decoder side ME may be performed for the collocated block in the reference pictures, instead of the spatial neighboring blocks in the current picture.

Figure 7:
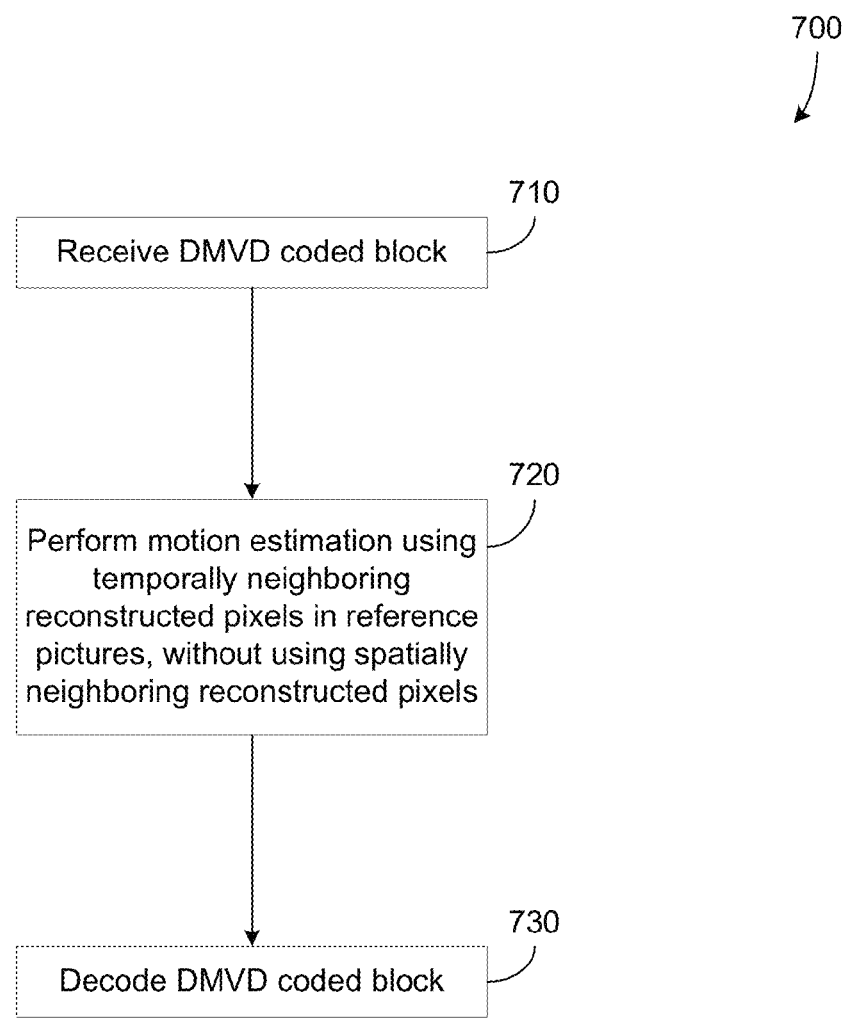
FIG. 7 is a flowchart illustrating motion estimation and decoding of a DMVD encoded block, according to an embodiment.

This decoding strategy is illustrated in FIG. 7. At 710, a DMVD coded block may be received at a decoder. At 720, ME may be performed. This may be done using temporally neighboring reconstructed pixels in reference pictures. Spatially neighboring reconstructed pixels are not used. At 730, the DMVD coded block may be decoded.

In an embodiment, the decoding may be done in parallel with the decoding of non-DMVD coded blocks. Since the reconstructed reference pictures are ready before the decoding of the current picture, such that the decoder side ME may only perform on the reference pictures, there may be no decoding dependency of DMVD encoded blocks on the spatially neighboring reconstructed pixels. As a result, the DMVD encoded blocks and the non-DMVD encoded inter-frame coded blocks may be decoded in parallel.

Motion Vector Prediction Dependency

Though the decoding dependency on spatially neighboring reconstructed pixels may be addressed with the above system and method, there may still be motion vector prediction dependency in the decoding process. In the H.264/AVC standard, to remove the motion vector redundancy, the motion vector of a block may be first predicted from the motion vectors of its spatially or temporally neighboring blocks. The difference between the final motion vector and the predicted motion vector may then be encoded into the bitstream for transmission to the decoder side. At the decoder side, to obtain the final motion vector of current block, the predicted motion vector may first be calculated from the decoded motion vectors of the spatially or temporally neighboring blocks, and then the decoded motion vector difference may be added to the predicted motion vector to get the final decoded motion vector for current block.

If DMVD mode is used, the decoder can derive the motion vector itself for the DMVD coded blocks. But for the non-DMVD coded blocks, its motion vectors may still be decoded in the manner described above. Now, if a block is encoded in the DMVD mode, its motion vectors will only be available after performing the decoder side ME. If these motion vectors were to be used to predict the motion vectors of its spatial neighboring blocks, the decoding of spatial neighboring blocks may only be started after the decoder side ME of the DMVD coded block has been finished. This motion vector prediction dependency may affect the efficiency of a parallel implementation of the block decoding.

Figure 8:
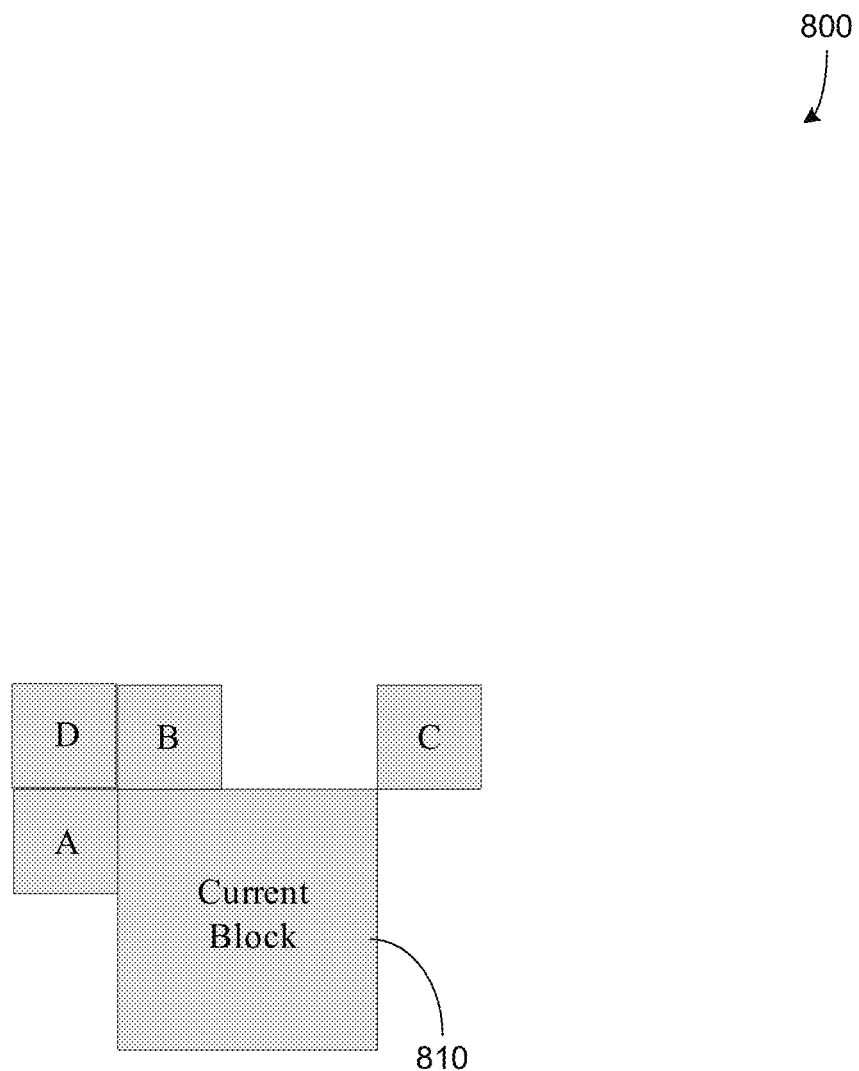
FIG. 8 illustrates a current block and neighboring blocks that may be used in the decoding of the current block, according to an embodiment.

As shown in FIG. 8, when encoding a current block, such as block 810, the motion vectors of its four spatially neighboring blocks (A, B, C, and D) may be used to predict its motion vectors. If any one of the blocks A, B, C and D is encoded in DMVD mode, one of the following schemes may be applied to remove the motion vector dependency on the DMVD block.

Figure 9:
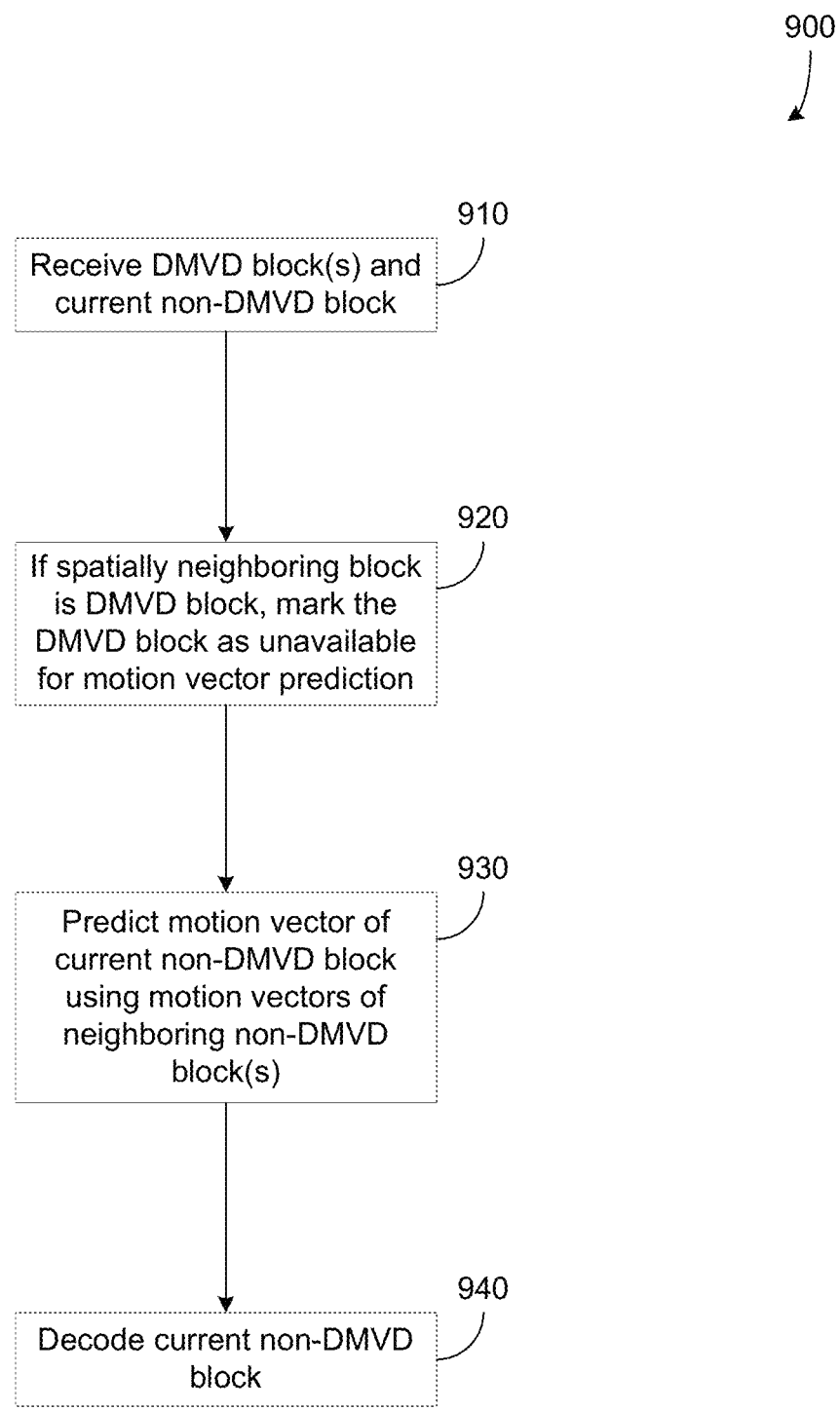
FIG. 9 is a flowchart illustrating motion estimation and decoding of a non-DMVD encoded block, according to an embodiment.

In an embodiment, if a spatial neighboring block is a DMVD block, its motion vectors may be marked as unavailable in the motion vector prediction process. That is, the motion vectors of current blocks are predicted from the motion vectors of non-DVMD coded neighboring blocks. This is illustrated in FIG. 9. At 910, the current non-DMVD block may be received, along with one or more DMVD blocks. At 920, a determination may be made as to whether there is a spatially neighboring DMVD block, relative to the current non-DMVD block. In particular, the determination may be made as to whether there is a DMVD block that neighbors the non-DMVD block in any of the positions A . . . D shown in FIG. 8. If so, then such a DMVD block may be marked as unavailable for purposes of motion vector prediction for the non-DMVD block. At 930, a motion vector for the current non-DMVD block may be predicted, using motion vectors of neighboring non-DMVD blocks. At 940, the current non-DMVD block may be decoded.

Figure 10:
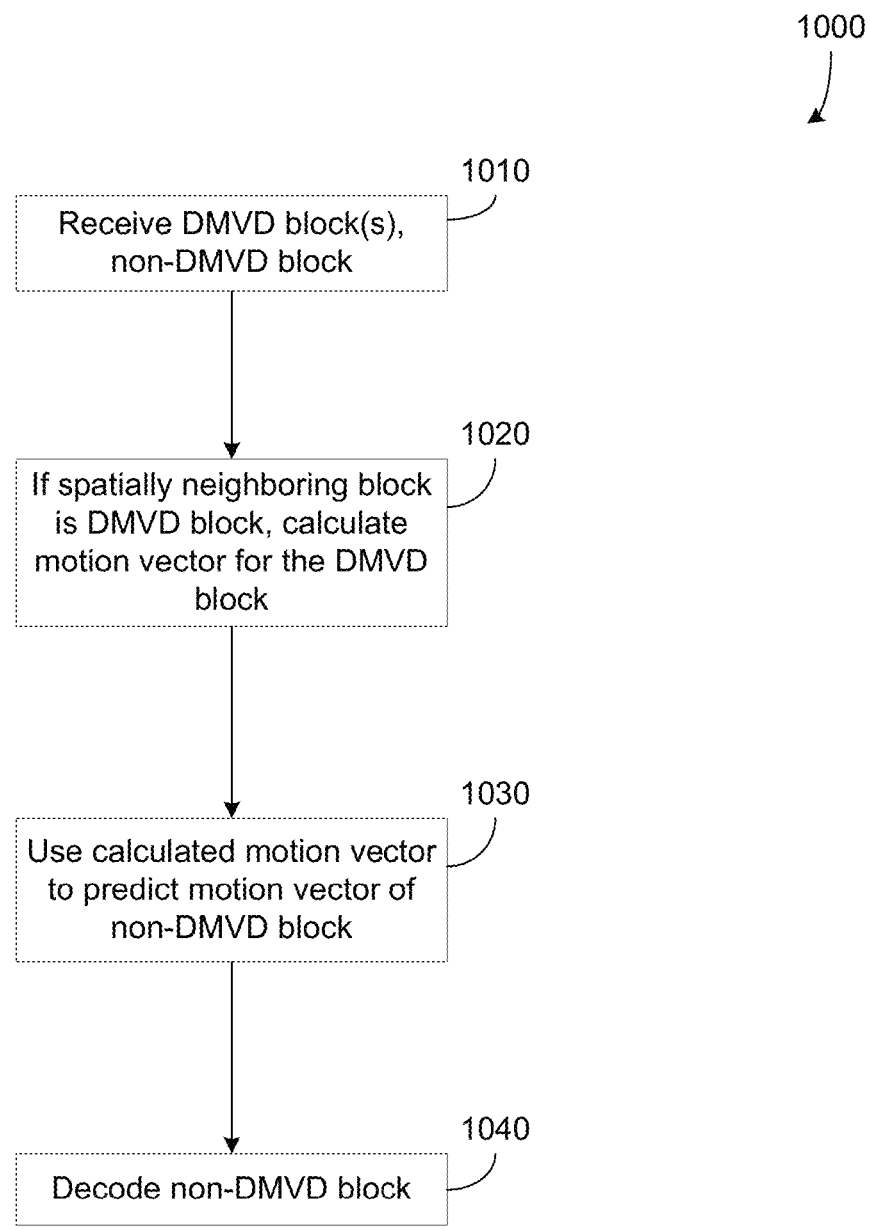
FIG. 10 is a flowchart illustrating motion estimation and decoding of a non-DMVD encoded block, according to an alternative embodiment.

In an alternative embodiment, if there is a DMVD block that spatially neighbors the non-DMVD block in any of positions A . . . D (see FIG. 8), a different approach may be used for decoding the non-DMVD block. Such an embodiment is illustrated in FIG. 10. At 1010, a decoder receives the current non-DMVD block, along with one or more spatially neighboring DMVD blocks. At 1020, if a spatially neighboring block is a DMVD block, a motion vector may be calculated for this DMVD block. At 1030, the calculated motion vector may be used to predict the motion vector of the current non-DMVD block. At 1040, the current non-DMVD block may be decoded, given this predicted motion vector.

Since this calculated motion vector may be prepared before performing decoder side ME, the decoding process of the neighboring blocks, e.g., the current non-DMVD block, may be started immediately without waiting for the decoder side ME process of the DMVD-coded block to be finished. Then, DMVD coded blocks and the current non-DMVD coded block may be decoded in parallel.

The motion vector of the neighboring DMVD block may be determined in any of several ways. For example, in an embodiment, the calculated motion vector for DMVD block may be the weighted average of its available spatially neighboring block motion vectors.

In an alternative embodiment, the calculated motion vector for the DMVD block may be a median filtered value of its available spatial neighboring block motion vectors.

In an alternative embodiment, the calculated motion vector for the DMVD block may be a weighted average of scaled available temporally neighboring block motion vectors.

In an alternative embodiment, the calculated motion vector for the DMVD block may be a median filtered value of scaled available temporally neighboring block motion vectors.

In an alternative embodiment, the calculated motion vector for the DMVD block may be a weighted average of its available spatially neighboring block motion vectors and the scaled available temporally neighboring block motion vectors.

In an alternative embodiment, the calculated motion vector for the DMVD block may be a median filtered value of its available spatially neighboring block motion vectors and the scaled available temporally neighboring block motion vectors.

With the above schemes, the motion vector prediction dependency on DMVD block motion vectors may be removed. Combined with removal of the dependency on spatially neighboring reconstructed pixels, the decoder may decode the inter-frame coded blocks (whether they are encoded in DMVD mode or non-DMVD mode) in parallel. This may allow greater use of the parallel implementation of a decoder on a multi-core platform.

Fast Candidate Search for Motion Vectors

The ME for a DMVD block may be performed using full search within a search window, or using any other fast motion search algorithms, so long as the encoder and decoder use the identical motion search scheme. In an embodiment, a fast candidates-based ME process may be used. Here, the motion search process need only check a relatively small set of candidate motion vectors, instead of checking all the possibilities in the search window. The encoder and decoder may use the same candidates to avoid any mismatch.

Candidate motion vectors may be derived from the motion vectors of the spatially coded neighboring blocks and temporally coded neighboring blocks. Candidate motion vectors can be refined by performing a small range motion search around such motion vectors.

In an embodiment, all candidate motion vectors may be checked first, and the best one (e.g., that generates the minimal sum of absolute differences) may be selected. A small range motion search may then be performed around this best candidate to get the final motion vector.

In an embodiment, a small range motion search may be performed around each candidate motion vector to refine it, and the best refined candidate (e.g., with minimum SAD) may be selected as the final motion vector.

Implementation

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 11:
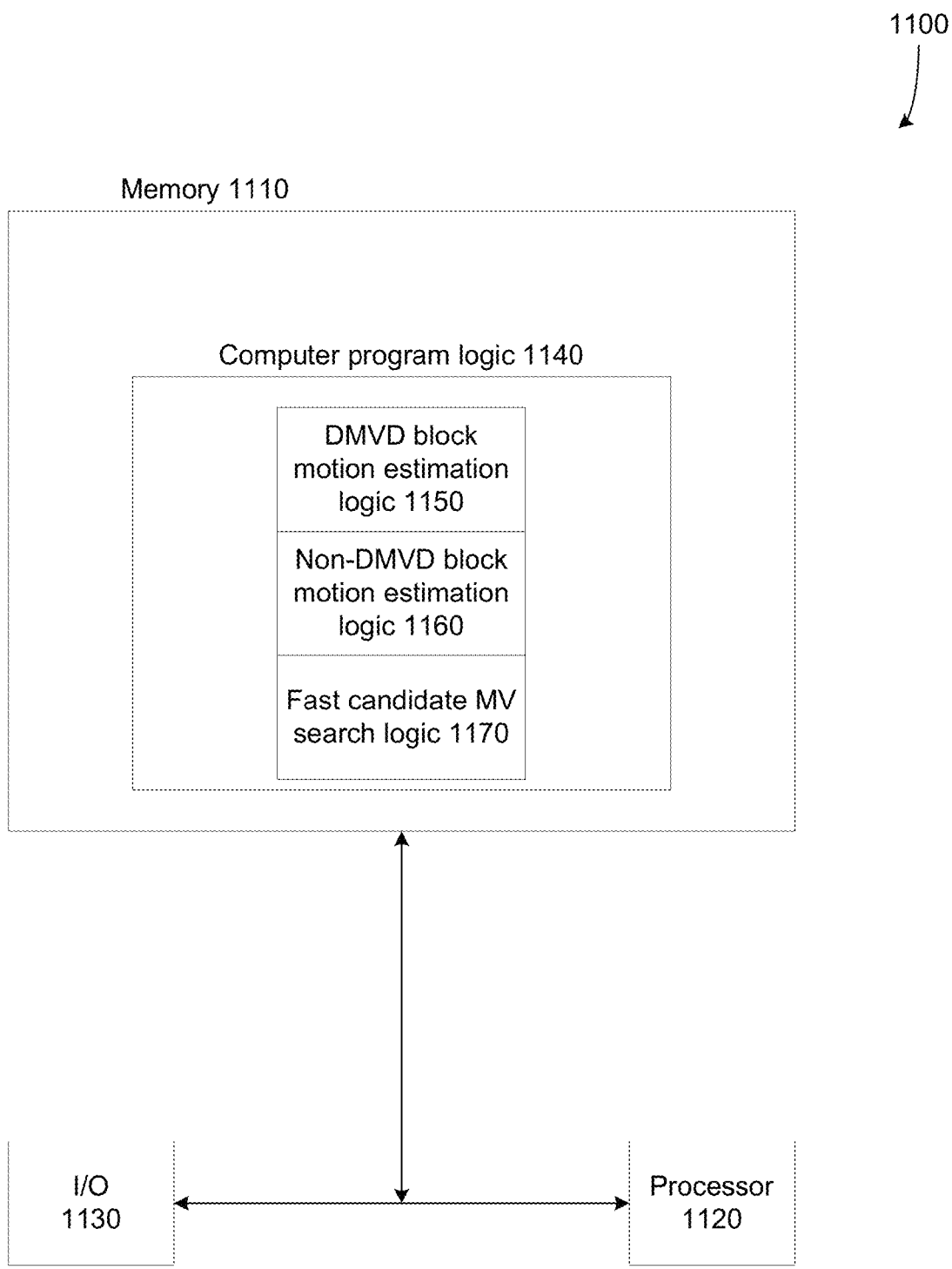
FIG. 11 is a diagram illustrating a software or firmware implementation of an embodiment.

A software or firmware embodiment of the processing described above is illustrated in FIG. 11. System 1100 may include a processor 1120 and a body of memory 1110 that may include one or more computer readable media that may store computer program logic 1140. Memory 1110 may be implemented as a hard disk and drive, a removable media such as a compact disk and drive, or a read-only memory (ROM) device, for example. Processor 1120 and memory 1110 may be in communication using any of several technologies known to one of ordinary skill in the art, such as a bus. Logic contained in memory 1110 may be read and executed by processor 1120. One or more I/O ports and/or I/O devices, shown collectively as I/O 1130, may also be connected to processor 1120 and memory 1110.

Computer program logic 1140 may include logic modules 1150-1170. In an embodiment, logic 1150 may be responsible for the processing described above for cases where the current block is a DMVD block. Logic 1160 may be responsible for the processing described above where the current block is a non-DMVD block. Logic 1170 may be responsible for implementation of fast candidate search for motion vectors as described above.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
    receiving a decoder-side motion vector derivation (DMVD) encoded block and a non-DMVD encoded block;
    determining the DMVD encoded block is spatially neighboring the non-DMVD encoded block;
    for the DMVD encoded block, performing motion estimation (ME) using temporally neighboring reconstructed pixels in reference pictures, without using spatially neighboring reconstructed pixels in a current picture;
    for the non-DMVD encoded block, predicting a motion vector of the non-DMVD encoded block based, at least in part, on motion vectors of spatially neighboring blocks, and recovering a motion vector difference from received data, wherein said predicting comprises at least one of:
        limiting the spatially neighboring blocks to an available subset of the spatially neighboring blocks that excludes the DMVD block as unavailable for motion vector prediction for the non-DMVD encoded block, or
        calculating a motion vector of the DMVD encoded block based on an available subset of blocks spatially neighboring the DMVD block and using the calculated motion vector in the motion vector predicting for the non-DMVD encoded block before completing decoder-side motion estimation of the DMVD encoded block; and
    decoding the DMVD encoded block and the non-DMVD encoded block in parallel.

2. The method of claim 1, wherein said calculating of a motion vector of the DMVD encoded block that neighbors the non-DMVD encoded block comprises:
    calculating a weighted average of motion vectors of the available blocks that spatially neighbor the neighboring DMVD block.

3. The method of claim 1, wherein said calculating of a motion vector of the DMVD encoded block that neighbors the non-DMVD encoded block comprises:
    calculating a median filtered value for motion vectors of the available blocks that spatially neighbor the neighboring DMVD block.

4. The method of claim 1, wherein said calculating of a motion vector of the DMVD encoded block that neighbors the non-DMVD encoded block comprises:
    calculating a weighted average of scaled motion vectors of the available blocks that temporally neighbor the neighboring DMVD encoded block.

5. The method of claim 1, wherein said calculating of a motion vector of the DMVD encoded block that neighbors the non-DMVD encoded block comprises:
    calculating a median filtered value of scaled motion vectors of the available blocks that temporally neighbor the neighboring DMVD block.

6. The method of claim 1, wherein said calculating of a motion vector of the DMVD encoded block that neighbors the non-DMVD encoded block comprises:
    calculating a weighted average of
        motion vectors of the available blocks that spatially neighbor the neighboring DMVD block, and
        motion vectors of the available blocks that temporally neighbor the neighboring DMVD block.

7. The method of claim 1, wherein said calculating of a motion vector of the DMVD encoded block that neighbors the non-DMVD encoded block comprises:
    calculating a median filtered value of
        motion vectors of the available blocks that spatially neighbor the neighboring DMVD block, and
        motion vectors of the available blocks that temporally neighbor the neighboring DMVD block.

8. The method of claim 1, wherein said calculating of a motion vector of the DMVD encoded block that neighbors the non-DMVD encoded block comprises:
    performing a fast candidate-based motion estimation, by searching in a small range for a best candidate motion vector for the DMVD block, and choosing the best candidate motion vector on the basis of whether the candidate motion vector generates a minimal sum of absolute differences.

9. A system, comprising:
    a processor; and
    a memory in communication with said processor, for storing a plurality of processing instructions for directing said processor to
        receive a decoder-side motion vector derivation (DMVD) encoded block and a non-DMVD encoded block;
        determine the DMVD encoded block is spatially neighboring the non-DMVD encoded block;
        for the DMVD encoded block, perform motion estimation (ME) using temporally neighboring reconstructed pixels in reference pictures, without using spatially neighboring reconstructed pixels in a current picture;
        for the non-DMVD encoded block, predict a motion vector of the non-DMVD encoded block based, at least in part, on motion vectors of spatially neighboring blocks, and recover a motion vector difference from received data, wherein said predict comprises at least one of:
            a limit on the spatially neighboring blocks to an available subset of the spatially neighboring blocks that excludes the DMVD block as unavailable for motion vector prediction for the non-DMVD encoded block, or
            a calculation of a motion vector of the DMVD encoded block based on an available subset of blocks spatially neighboring the DMVD block and a use of the calculated motion vector in the motion vector prediction for the non-DMVD encoded block before decoder-side motion estimation of the DMVD encoded block is completed; and decode the DMVD encoded block and the non-DMVD encoded block in parallel.

10. The system of claim 9, wherein said processing instructions for directing said processor to calculate a motion vector of the DMVD encoded block that neighbors the non-DMVD encoded block comprise:

processing instructions for directing said processor to calculate a weighted average of motion vectors of the available blocks that spatially neighbor the neighboring DMVD block.

11. The system of claim 9, wherein said processing instructions for directing said processor to calculate a motion vector of the DMVD encoded block that neighbors the non-DMVD encoded block comprise:

processing instructions for directing said processor to calculate a median filtered value for motion vectors of the available blocks that spatially neighbor the neighboring DMVD block.

12. The system of claim 9, wherein said processing instructions for directing said processor to calculate a motion vector of the DMVD encoded block that neighbors the non-DMVD encoded block comprise:

processing instructions for directing said processor to calculate a weighted average of scaled motion vectors of the available blocks that temporally neighbor the neighboring DMVD encoded block.

13. The system of claim 9, wherein said processing instructions for directing said processor to calculate a motion vector of the DMVD encoded block that neighbors the non-DMVD encoded block comprise:

processing instructions for directing said processor to calculate a median filtered value of scaled motion vectors of the available blocks that temporally neighbor the neighboring DMVD block.

14. The system of claim 9, wherein said processing instructions for directing said processor to calculate a motion vector of the DMVD encoded block that neighbors the non-DMVD encoded block comprise:

processing instructions for directing said processor to calculate a weighted average of
motion vectors of the available blocks that spatially neighbor the neighboring DMVD block, and
motion vectors of the available blocks that temporally neighbor the neighboring DMVD block.

15. The system of claim 9, wherein said processing instructions for directing said processor to calculate a motion vector of the DMVD encoded block that neighbors the non-DMVD encoded block comprise:

processing instructions for directing said processor to calculate a median filtered value of
motion vectors of the available blocks that spatially neighbor the neighboring DMVD block, and
motion vectors of the available blocks that temporally neighbor the neighboring DMVD block.

16. The system of claim 9, wherein said processing instructions for directing said processor to calculate a motion vector of the DMVD encoded block that neighbors the non-DMVD encoded block comprise:

processing instructions for directing said processor to perform a fast candidate-based motion estimation, by searching in a small range for a best candidate motion vector for the DMVD block, and choosing the best candidate motion vector on the basis of whether the candidate motion vector generates a minimal sum of absolute differences.

17. A computer program product including a non-transitory computer readable medium having computer program logic stored therein, the computer program logic comprising:

logic to cause a processor to receive a decoder-side motion vector derivation (DMVD) encoded block and a non-DMVD encoded block;

logic to cause the processor to determine the DMVD encoded block is spatially neighboring the non-DMVD encoded block;

logic to cause the processor, for the DMVD encoded block, to perform motion estimation (ME) using temporally neighboring reconstructed pixels in reference pictures, without using spatially neighboring reconstructed pixels in a current picture;

logic to cause the processor, for the non-DMVD encoded block, to predict a motion vector of the non-DMVD encoded block based, at least in part, on motion vectors of spatially neighboring blocks, and to recover a motion vector difference from received data wherein said predict comprises at least one of:

a limit on the spatially neighboring blocks to an available subset of the spatially neighboring blocks that excludes the DMVD block as unavailable for motion vector prediction for the non-DMVD encoded block, or a calculation of a motion vector of the DMVD encoded block based on an available subset of blocks spatially neighboring the DMVD block and a use of the calculated motion vector in the motion vector prediction for the non-DMVD encoded block before decoder-side motion estimation of the DMVD encoded block is completed; and logic to cause the processor to decode the DMVD encoded block and the non-DMVD encoded block in parallel.

18. The computer program product of claim 17, wherein the computer program logic to cause the processor to calculate of a motion vector of the DMVD encoded block that neighbors the non-DMVD encoded block comprises:

logic to cause the processor to calculate a weighted average of motion vectors of the available blocks that spatially neighbor the neighboring DMVD block.

19. The computer program product of claim 17, wherein the computer program logic to cause the processor to calculate a motion vector of the DMVD encoded block that neighbors the non-DMVD encoded block comprises:

logic to cause the processor to calculate a median filtered value for motion vectors of the available blocks that spatially neighbor the neighboring DMVD block.

20. The computer program product of claim 17, wherein the computer program logic to cause the processor to calculate a motion vector of the DMVD encoded block that neighbors the non-DMVD encoded block comprises:

logic to cause the processor to calculate a weighted average of scaled motion vectors of the available blocks that temporally neighbor the neighboring DMVD encoded block.

21. The computer program product of claim 17, wherein the computer program logic to cause the processor to calculate a motion vector of the DMVD encoded block that neighbors the non-DMVD encoded block comprises:
  logic to cause the processor to calculate a median filtered value of scaled motion vectors of blocks that temporally neighbor the neighboring DMVD block.

22. The computer program product of claim 17, wherein the computer program logic to cause the processor to calculate a motion vector of the DMVD encoded block that neighbors the non-DMVD encoded block comprises:
  logic to cause the processor to calculate a weighted average of
    motion vectors of the available blocks that spatially neighbor the neighboring DMVD block, and
    motion vectors of the available blocks that temporally neighbor the neighboring DMVD block.

23. The computer program product of claim 17, wherein the computer program logic to cause the processor to calculate a motion vector of the DMVD encoded block that neighbors the non-DMVD encoded block comprises:
  logic to cause the processor to calculate a median filtered value of
    motion vectors of the available blocks that spatially neighbor the neighboring DMVD block, and
    motion vectors of the available blocks that temporally neighbor the neighboring DMVD block.

24. The computer program product of claim 17, wherein the computer program logic to cause the processor to calculate a motion vector of a DMVD encoded block that neighbors the non-DMVD encoded block comprises:
  logic to cause the processor to perform a fast candidate-based motion estimation, by searching in a small range for a best candidate motion vector for the DMVD block, and choosing the best candidate motion vector on the basis of whether the candidate motion vector generates a minimal sum of absolute differences.

* * * * *